Jan. 21, 1930.   H. MICHEL ET AL   1,744,485
METHOD AND MEANS FOR THE EXAMINATION OF JEWELS
Filed Feb. 19, 1926   2 Sheets-Sheet 1
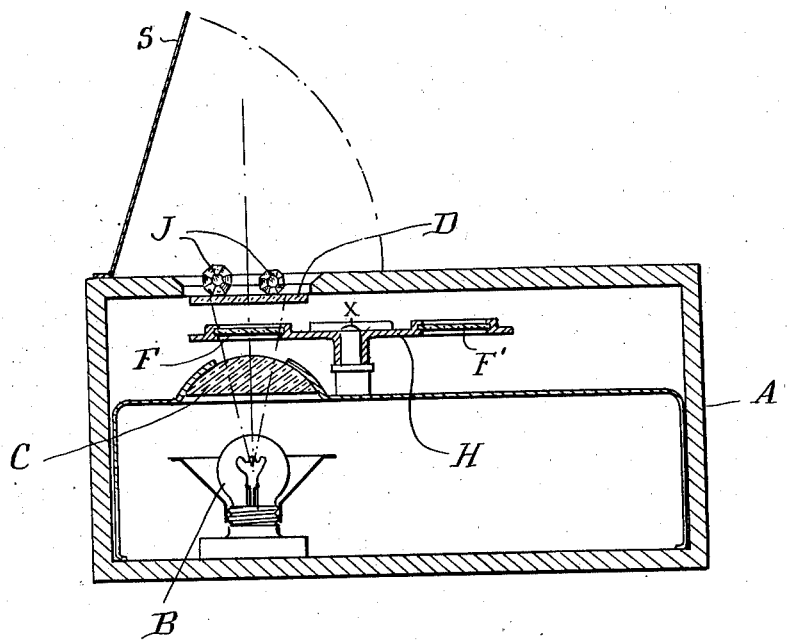
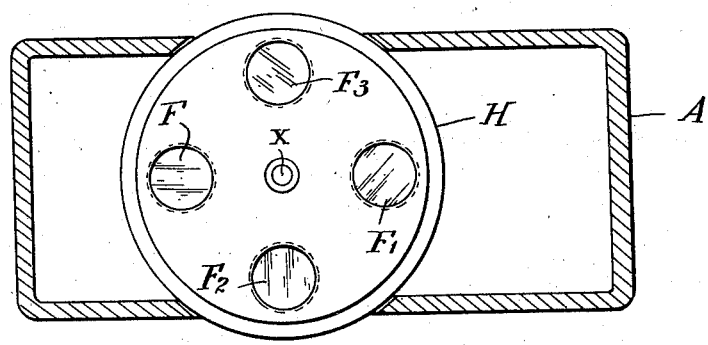
INVENTOR
Hermann Michel and
Gustav Riedl
BY
ATTORNEYS

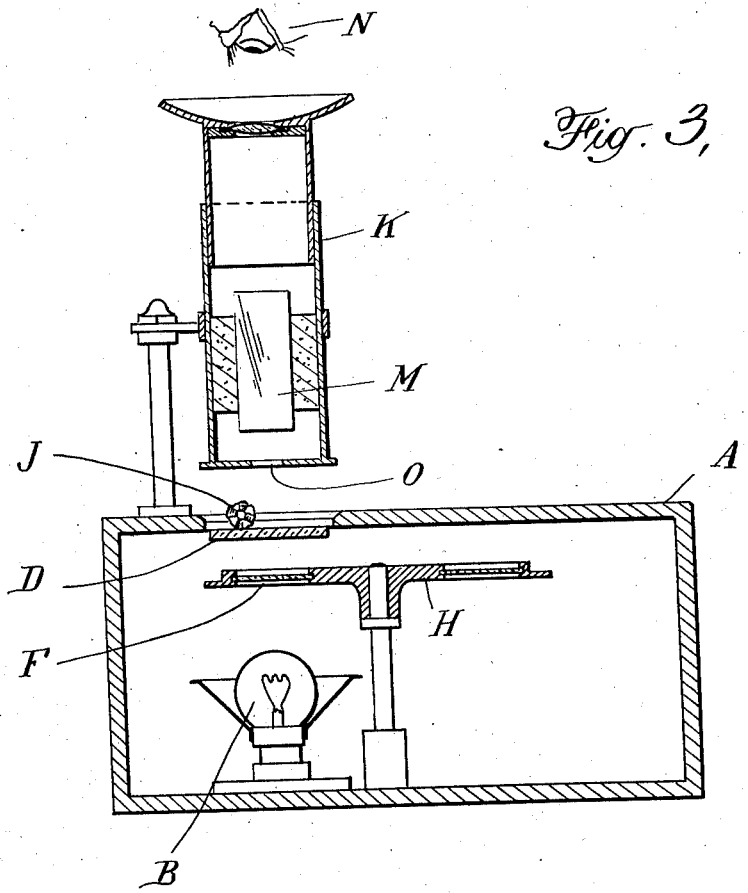
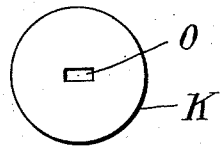

Patented Jan. 21, 1930

1,744,485

UNITED STATES PATENT OFFICE

HERMANN MICHEL AND GUSTAV RIEDL, OF VIENNA, AUSTRIA, ASSIGNORS OF ONE-THIRD TO GUSTAVE L. HERZ, OF NEW YORK, N. Y.

METHOD AND MEANS FOR THE EXAMINATION OF JEWELS

Application filed February 19, 1926, Serial No. 89,286, and in Austria February 21, 1925.

The object of this invention is a method of and apparatus for utilizing the optical properties of coloured substances, minerals, crystals, jewels, etc., to distinguish between valuable coloured jewels and others of the same colour but of a different less valuable kind; also between genuine jewels and their imitations. The following is the principle involved:

The mineral is put in such a position that the light rays of a lamp can pass freely through it, and that various colour filters can be inserted between the source of light and the mineral to be examined. It may happen that different minerals of the same colour appear in the identical colour when the rays coloured by one colour filter pass through these two substances, but appear in two different colours when subjected to the rays coloured by another colour filter and can thereby be distinguished from one another. By arranging the colour filters in such a way that they can be easily changed, it is possible to distinguish between translucent or transparent materials, having different absorption characteristics for coloured light rays, also between the genuine minerals and imitations of the same colour, as also between objects of different luminescence.

The colour filters are selected from the following viewpoints:

The characteristics of the variously coloured minerals with respect to light absorption are first established by spectroscopic examination. The colour filters are then selected in such a way that their absorption of part of the spectrum will produce differences between various substances of the same colour when observed in the filtered light.

In order to illustrate the method more clearly, we will describe the selection of filters which will enable to distinguish between a genuine emerald, a blue-green turmalin and a green glass. Read on the scale of a pocket spectroscope, the approximate figures of the wave lengths are as follows:

The emerald shows weak red light between 7000–6100 Å (Å=1 Augstroem-unit). The yellow rays are nearly totally absorbed between 6100 Å and 5750 Å. The green tints are more intense between 5750 Å and 5000 Å. The blue tints are very much weaker between 5000 Å and 4750 Å, but still clearly distinguishable.

The blue-green turmaline shows the red part of the spectrum totally annihilated up to 6500 Å. From 6500 Å downwards all colour tints of the spectrum can be observed.

The green glass shows weak red tints from 6300 Å–6000 Å, and intense yellow and green tints from 6000–5100 Å, and blue tints from 5000 Å–4600 Å.

The filter No. 1 now only permits red light of the wave lengths of 7500–6650 Å to pass through and annihilate the tints between 6650 Å and 5100 Å, and permits blue tints between 5100 Å and 4250 Å to pass through.

Filter No. 2 permits red rays from 7600 Å–6700 Å to pass through; tints between 6700–5900 Å are annihilated. The green tints between 5900 and 5400 Å pass through more intensely than the green tints from 5400 Å and 5000 Å which are very much weakened. The tints below 5000 Å are practically annihilated.

By combining these two filters, the emerald therefore appears in a peculiar red tint on filter 1 and 2, whereas the turmalin and the glass appear blue on filter 1 and green on filter 2.

We have also combined a dichroscope with our instrument for the following reasons:

The colour of a mineral is due to the absorption of certain portions of white light in its passage through the mineral. This is known as "selective absorption". The remainder of the white light, namely that which is not absorbed in the mineral, blends to produce the colour seen. In anisotropic substances the remaining colour is depending upon the sense of undulation. In the dichroscope the colors are seen side by side and very slight variations in tints are thus easily recognized. By observing minerals illuminated by filtered light, through the dichroscope, distinguishing characteristics may more easily be recognized.

The objects and advantages of the invention will be better understood by reference to the accompanying drawing in which Fig. 1 is a vertical section through the apparatus;

Fig. 2 is a section on the line 2—2 of Fig. 1;

Fig. 3 is a vertical section through a modified apparatus; and

Fig. 4 is a view of the lower end of the dichroscope shown in Fig. 3.

In Figure 1 A is a wooden case, on the bottom of which an incandescent lamp (B) has been fastened. A lens (C) collects the rays emanating from this lamp and throws them through the colour filter (F), to the jewels (J) placed on a stationary glass disk (D). S is a shield protecting the eye from outside light.

The colour filters F, $F^1$, $F^2$, $F^3$, set into a metal disk (H) which revolves around an axis (X) as shown in Figure 2.

Figure 3 shows the instrument with the dichroscope attached. K is the dichroscope, consisting of a refracting rhombohedren of calcite or Iceland spar (M), mounted in a cylindrical case. At the lower end is a small rectangular opening (O) and at the other end an eyepiece (N).

In using the apparatus a mineral to be tested is mounted upon the support therefor. The proper filter is then interposed between the source of light and the mineral. The effect is noted and another selected filter is interposed. The observation is repeated and the results are compared with similar observations of a standard mineral, that is, one of known quality.

Various changes may be made in the details of the operation as well as in the apparatus employed without departing from the invention or sacrificing any of the advantages thereof.

What we claim as our invention is:

1. In an apparatus for examining transparent and translucent substances, the combination of a source of light, means for projecting a beam therefrom, a support for the substance to be examined in the path of the beam, a rotatable table having a plurality of light filters thereon adapted to be disposed between the support and the beam-projecting means and a dichroscope above the support.

2. The method of establishing the identity of colored transparent and translucent minerals which comprises subjecting the mineral to a beam of light, successively filtering selected portions of the spectrum from the beam before it passes through the mineral so that the mineral appears in a different color, observing the effect of each of the filtered lights passing through the mineral and comparing the observations with the previously ascertained effect upon minerals of known identity.

In testimony whereof we affix our signatures.

HERMANN MICHEL.
GUSTAV RIEDL.

CERTIFICATE OF CORRECTION.

Patent No. 1,744,485. Granted January 21, 1930, to

HERMANN MICHEL ET AL.

It is hereby certified that error appears in the printed specification of the above numbered patent requiring correction as follows: Page 1, line 25, for the word "materials" read "minerals"; and that the said Letters Patent should be read with this correction therein that the same may conform to the record of the case in the Patent Office.

Signed and sealed this 4th day of March, A. D. 1930.

(Seal)

M. J. Moore,
Acting Commissioner of Patents.